United States Patent
Shen et al.

(10) Patent No.: US 9,582,866 B2
(45) Date of Patent: Feb. 28, 2017

(54) ADAPTIVE CONTRAST ENHANCEMENT APPARATUS AND METHOD

(71) Applicant: VIA TECHNOLOGIES, INC., New Taipei (TW)

(72) Inventors: De-Wei Shen, New Taipei (TW); Sheng-Che Tsao, New Taipei (TW)

(73) Assignee: VIA TECHNOLOGIES, INC., New Taipei (TW)

( * ) Notice: Subject to any disclaimer, the term of this patent is extended or adjusted under 35 U.S.C. 154(b) by 132 days.

(21) Appl. No.: 14/643,205

(22) Filed: Mar. 10, 2015

(65) Prior Publication Data

US 2016/0267631 A1 Sep. 15, 2016

(51) Int. Cl.
*G06K 9/40* (2006.01)
*G06T 5/00* (2006.01)
*G06T 5/40* (2006.01)

(52) U.S. Cl.
CPC ........... *G06T 5/009* (2013.01); *G06T 7/90* (2017.01); *G06T 5/40* (2013.01); *G06T 2207/10024* (2013.01); *G06T 2207/20008* (2013.01); *G06T 2207/20021* (2013.01); *G06T 2207/20208* (2013.01); *G06T 2210/36* (2013.01)

(58) Field of Classification Search
USPC ....... 382/167, 254, 274, 162, 169, 170, 172; 345/82, 214, 618; 348/28, 661, 607, 672, 348/254; 358/3.27
See application file for complete search history.

(56) References Cited

U.S. PATENT DOCUMENTS

| | | | | |
|---|---|---|---|---|
| 5,963,665 A * | 10/1999 | Kim | ................ | G06T 5/40 348/254 |
| 6,075,890 A * | 6/2000 | Park | ................ | G06T 5/40 348/672 |
| 6,259,472 B1 * | 7/2001 | Park | ................ | G06T 5/40 348/28 |
| 7,019,756 B2 | 3/2006 | Park et al. | | |
| 7,170,645 B2 * | 1/2007 | Kim | ................ | H04N 1/4072 348/607 |

(Continued)

FOREIGN PATENT DOCUMENTS

| | | |
|---|---|---|
| CN | 1770254 | 5/2006 |
| CN | 101141595 | 3/2008 |

(Continued)

*Primary Examiner* — Anh Do
(74) *Attorney, Agent, or Firm* — McClure, Qualey & Rodack, LLP

(57) ABSTRACT

An adaptive contrast enhancement method, the steps include: calculating a probability density function based on pixel values of a plurality of pixels of an input image signal; dividing the plurality of pixels into one of a plurality of low-brightness sets and high-brightness sets according to the pixel values of the plurality of pixels, wherein a part of the plurality of pixels with pixel values below one of a plurality of delimiting values are allocated to the low-brightness set and a part of the plurality of pixels with pixel values above the delimiting value are allocated to the high-brightness set; determining a mapping function according to the probability of the plurality of pixels in the low-brightness set and the probability of the plurality of pixels in the high-brightness set; and mapping the input image signal to an output image signal according to the mapping function.

16 Claims, 5 Drawing Sheets

(56) References Cited

U.S. PATENT DOCUMENTS

| | | |
|---|---|---|
| 2004/0179022 A1 | 9/2004 | Nair et al. |
| 2005/0036071 A1 | 2/2005 | Kim |
| 2006/0082689 A1 | 4/2006 | Moldvai |
| 2007/0279500 A1 | 12/2007 | Castorina et al. |
| 2008/0056567 A1 | 3/2008 | Kwon et al. |
| 2011/0123133 A1 | 5/2011 | Mohanty et al. |
| 2011/1012313 | 5/2011 | Mohanty et al. |
| 2013/0039577 A1 | 2/2013 | Chiu et al. |

FOREIGN PATENT DOCUMENTS

| | | |
|---|---|---|
| CN | 102231264 | 11/2011 |
| CN | 103606137 | 2/2014 |
| JP | 2002-125130 | 4/2002 |

\* cited by examiner

ADAPTIVE CONTRAST ENHANCEMENT APPARATUS AND METHOD

BACKGROUND OF THE INVENTION

Field of the Invention

The invention relates to an adaptive contrast enhancement apparatus and method, and more particularly, to an adaptive contrast enhancement apparatus and method that adaptively assign steep mapping functions to darker images and moderate mapping functions to brighter images so that all kinds of images may be properly adjusted to enhance contrast.

Description of the Related Art

In conventional contrast enhancement methods, an input image signal is mapped to an output image signal according to a mapping function (e.g., a gamma correction curve) that adjusts the relative brightness of low-brightness regions and high-brightness regions so that the contrast of the image may be adjusted. However, it is impossible for conventional gamma correction curves with simple and fixed function values to properly enhance contrasts of various images which may have strikingly different distributions of low-brightness and high-brightness pixels; therefore, an improved contrast enhancement method adaptive to all kinds of images with different brightness distributions is required.

BRIEF SUMMARY OF THE INVENTION

An embodiment of the present invention is directed to an adaptive contrast enhancement method, comprising: calculating a probability density function based on pixel values of a plurality of pixels of an input image signal; dividing the plurality of pixels into one of a plurality of low-brightness sets and high-brightness sets according to the pixel values of the plurality of pixels, wherein a part of the plurality of pixels with pixel values below one of a plurality of delimiting values is allocated to the low-brightness set and a part of the plurality of pixels with pixel values above the delimiting value are allocated to the high-brightness set; determining a mapping function according to the probability of the plurality of pixels in the low-brightness set and the probability of the plurality of pixels in the high-brightness set; and mapping the input image signal to an output image signal according to the mapping function.

Another embodiment of the present invention is directed to an adaptive contrast enhancement apparatus, comprising: a probability density function and cumulative distribution function calculator, calculating a probability density function based on pixel values of a plurality of pixels of an input image signal; a mapping function calculator, dividing the plurality of pixels into one of a plurality of low-brightness sets and high-brightness sets according to the pixel values of the plurality of pixels and determining a mapping function according to the probability of the plurality of pixels in the low-brightness set and the probability of the plurality of pixels in the high-brightness set, wherein a part of the plurality of pixels with pixel values below one of a plurality of delimiting values are allocated to the low-brightness set and a part of the plurality of pixels with pixel values above the delimiting value are allocated to the high-brightness set; and a mapper, mapping the input image signal to an output image signal according to the mapping function.

DETAILED DESCRIPTION OF THE INVENTION

The following description shows several exemplary embodiments which carry out the invention. This description is made for the purpose of illustrating the general principles of the invention and should not be taken in a limiting sense. The scope of the invention is best determined by reference to the appended claims.

Figure 1:
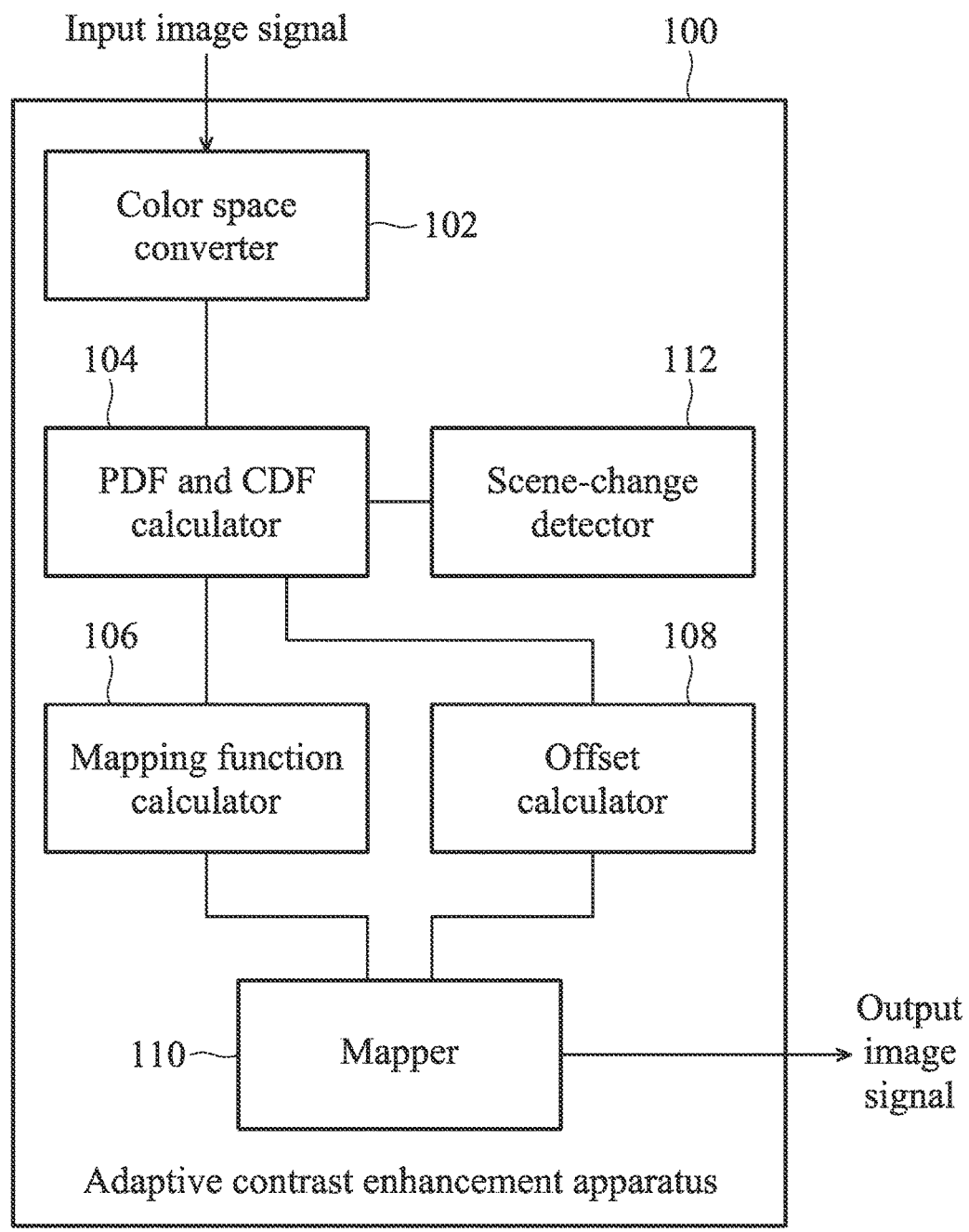
FIG. 1 is a block diagram of an adaptive contrast enhancement apparatus of an embodiment of the invention.

FIG. 1 shows a block diagram of an adaptive contrast enhancement apparatus 100 according to an embodiment of the present invention. The adaptive contrast enhancement apparatus 100 comprises a color space converter 102, a probability density function (PDF) and cumulative distribution function (CDF) calculator 104, a mapping function calculator 106, an offset calculator 108, and a mapper 110. The adaptive contrast enhancement apparatus 100 receives an input image signal from an image source (not shown), which comprises a plurality of pixels and may be a static image or a frame of a video, and outputs an output image signal with enhanced contrast to a display or a memory device such as a Dynamic Random Access Memory (DRAM) (not shown). In one embodiment, the color space converter 102 may convert the input image signal originally represented in a first color space (such as RGB color space) to a second color space (such as YCbCr color space) to be used in the PDF and CDF calculator 104. In another embodiment, such as when the input image signal is already in YCbCr color space or when RGB color space pixel values may be directly used in the PDF and CDF calculator 104, the color space converter 102 may be omitted and the input image signal may be directly inputted to the PDF and CDF calculator 104.

Figure 2A:
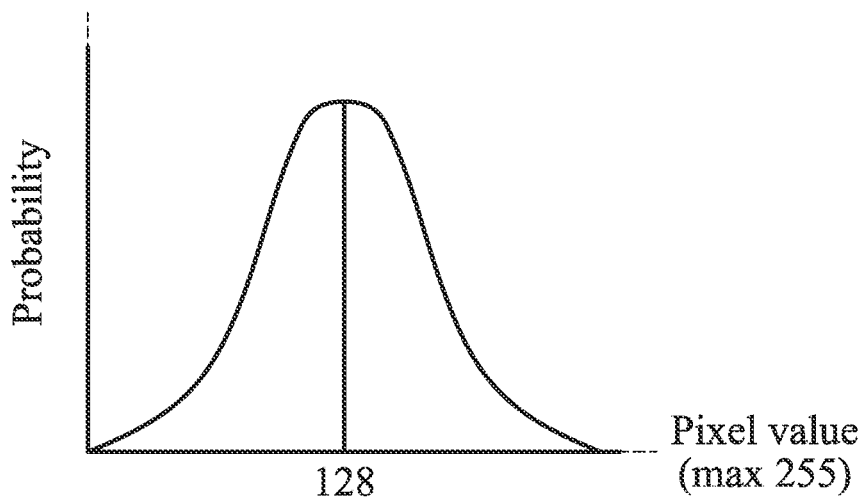
FIG. 2A and FIG. 2B are a PDF curve and a CDF curve, respectively, of an example of the invention.
Figure 2B:
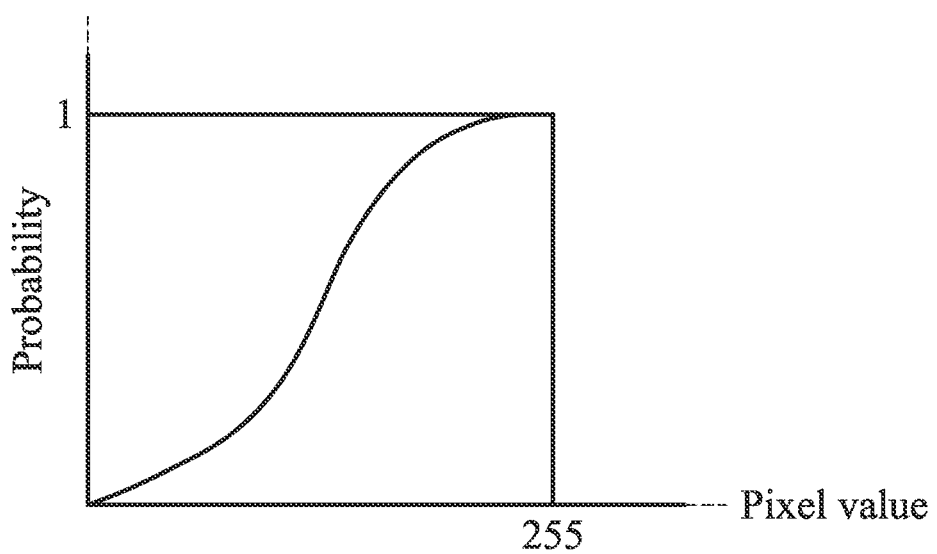

The PDF and CDF calculator 104 detects pixel values of the plurality of pixels of the input image signal, and accordingly calculates the probability density function (PDF) of the input image signal. The pixel value may be the grayscale value of three primary colors RGB, the grayscale value of color difference signals YCbCr, the brightness value (e.g., the luma Y), etc. In one embodiment, representing the pixel value by 8-bits will result in 256 levels. The PDF corresponding to the variation of the pixel values of the input image signal may then be calculated. The cumulative distribution functions (CDF) of the input image signals may be obtained by converting cumulative PDFs into monotonic increasing functions. FIG. 2A and FIG. 2B show a PDF curve and a CDF curve, respectively, as an example.

Figure 3:
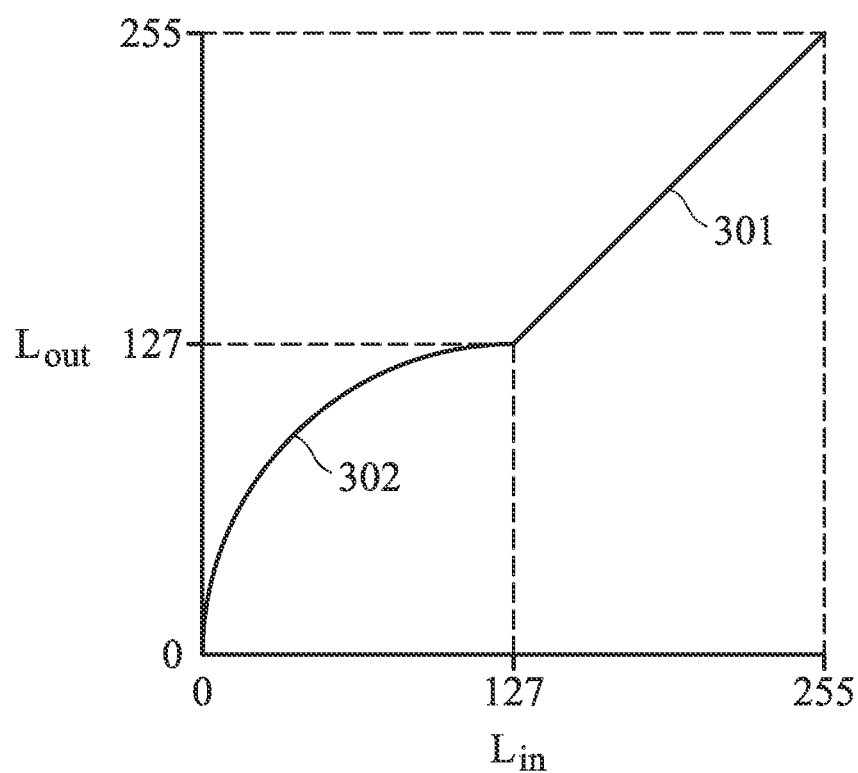
FIG. 3 is a curve of a mapping function of an embodiment of the invention.

The mapping function calculator 106 subsequently determines a mapping function to map the input image signal to the output image signal. In one embodiment, the mapping function may have two segments joined at a linear pixel value (as shown in FIG. 3), wherein an upper segment 301 of the mapping function above the linear pixel value may be a linear function with a slope of 1 (i.e., the output image signal pixel value is the same as the input image signal pixel value in the brighter part) and a lower segment 302 of the mapping function below the linear pixel value may be a gamma correction curve (i.e. pixel values are adjusted so that details of the darker part of the input image signal are emphasized in the output image signal). Such a mapping function may enhance the contrast in the darker part of the input image signal without causing overexposure in the brighter part. In one embodiment, if the pixel value is represented in 256 levels, the linear pixel value may be set at the midlevel of 127 and the exponent of the gamma correction curve may be 1/2.2, yet other values for the linear pixel value and the exponent may be designed according to different requirements and the invention is not limited thereto. In such an embodiment, the mapping function may have the form of:

$$\begin{cases} \frac{L_{out}}{127} = \left(\frac{L_{in}}{127}\right)^{1/2.2}, L_{in} \leq 127 \\ L_{out} = L_{in}, L_{in} > 127 \end{cases},$$

where $L_{in}$ is the pixel value of the input image signal and $L_{out}$ is the pixel value of the output image signal. FIG. 3 shows the curve of such a mapping function.

To adaptively enhance the contrast of the input image signal, in one embodiment, the mapping function calculator 106 may assign different gamma correction curves to the lower segment of the mapping function depending on the brightness of the input image signal, wherein steep mapping functions may be assigned to darker images and moderate mapping functions may be assigned to brighter images so that all kinds of images with different brightness distributions may all be properly adjusted to yield satisfying contrasts. In this embodiment, the plurality of pixels are divided into a low-brightness set and a high-brightness set according to the pixel values of the plurality of pixels, wherein a part of the plurality of pixels with pixel values below a delimiting value are allocated to the low-brightness set and a part of the plurality of pixels with pixel values above the delimiting value are allocated to the high-brightness set. A plurality of delimiting values may be used to divide the plurality of pixels into a plurality of low-brightness sets and a plurality of high-brightness sets each corresponding to one of the plurality of low-brightness sets. For example, four delimiting values of 16, 32, 64, and 128 may divide the plurality of pixels into four low-brightness/high-brightness sets of (0-15, 16-255), (0-31, 32-255), (0-63, 64-255), and (0-127, 128-255), wherein the two intervals in the parentheses are the pixel values allocated to the corresponding low-brightness set and the high-brightness set, respectively. Subsequently, the probability of the plurality of pixels in the low-brightness sets and the probability of the plurality of pixels in the high-brightness sets, as calculated by the PDF and CDF calculator 104, are compared to determine which gamma correction curve is to be assigned to the lower segment of the mapping function. In one embodiment, the probabilities of all four low-brightness/high-brightness sets are compared to determine whether they satisfy the condition of $P_{low}$>contrast factor×$P_{high}$, where $P_{low}$ and $P_{hi}$ are the probability of the corresponding low-brightness set and high-brightness set, respectively, and the contrast factor is a constant that may be designed according to different requirements (e.g., a value of 2 or 4). The four delimiting values of 16, 32, 64, and 128 may each correspond to a gamma correction curve with exponents of 1/2.2, 1/2.0, 1/1.8, and 1/1.6, respectively, wherein a smaller delimiting value corresponds to a gamma correction curve with a smaller exponent (i.e., a steeper curve). The information of the delimiting values and the gamma correction curves may be previously saved in a memory device (not shown) coupled to the adaptive contrast enhancement apparatus 100 and may be fixed or adjustable. The smallest delimiting value of the low-brightness/high-brightness sets that satisfy the condition of $P_{low}$>contrast factor×$P_{high}$ is used to determine the mapping function. For example, if the condition of $P_{low}$>contrast factor×$P_{high}$ is satisfied in all four low-brightness/high-brightness sets of (0-15, 16-255), (0-31, 32-255), (0-63, 64-255), and (0-127, 128-255), the smallest delimiting value that satisfy the condition is 16, and thus a gamma correction curve with an exponent of 1/2.2 may be assigned to the mapping function; in another example, if the condition of $P_{low}$>contrast factor×$P_{high}$ is only satisfied in the sets of (0-63, 64-255) and (0-127, 128-255), the smallest delimiting value that satisfy the condition is 64, and thus a gamma correction curve with an exponent of 1/1.8 may be assigned to the mapping function. The smaller the smallest delimiting value that satisfy the condition, the higher the probability of the plurality of pixels of the input image signal being relatively dark; therefore, by the mapping function calculator 106, steep mapping functions may be assigned to darker images (i.e., the smallest delimiting value being smaller) and moderate mapping functions may be assigned to brighter images (i.e., the smallest delimiting value being larger).

It may be seen that, if a low-brightness/high-brightness set with a smaller delimiting value satisfies the condition of $P_{low}$>contrast factor×$P_{high}$, then all the low-brightness/high-brightness sets with larger delimiting values may satisfy the condition as well. For example, if the probability in levels 0-31 is higher than that in levels 32-255 by the contrast factor, then the probability in levels 0-63 is obviously higher than that in levels 64-255 by the contrast factor, and so on. Therefore, in another embodiment, the probabilities of the low-brightness/high-brightness sets are sequentially compared from the smallest delimiting value to the largest delimiting value to determine whether they satisfy the condition, and when the condition is satisfied for a certain delimiting value, comparisons of low-brightness/high-brightness sets of larger delimiting values are not required.

Figure 4A:
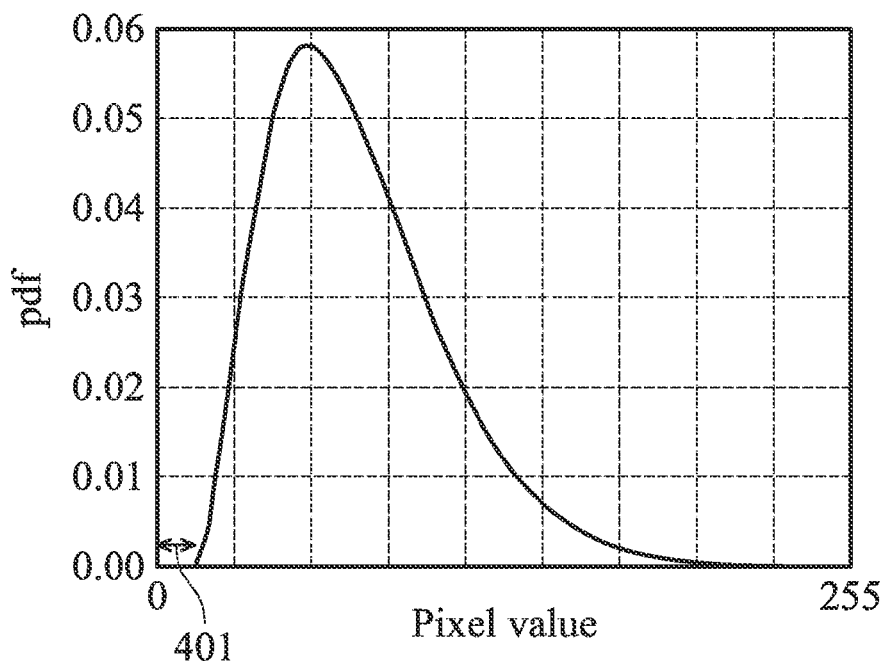
FIG. 4A and FIG. 4B are a PDF before and after shifting by an offset pixel value of an embodiment of the invention.
Figure 4B:
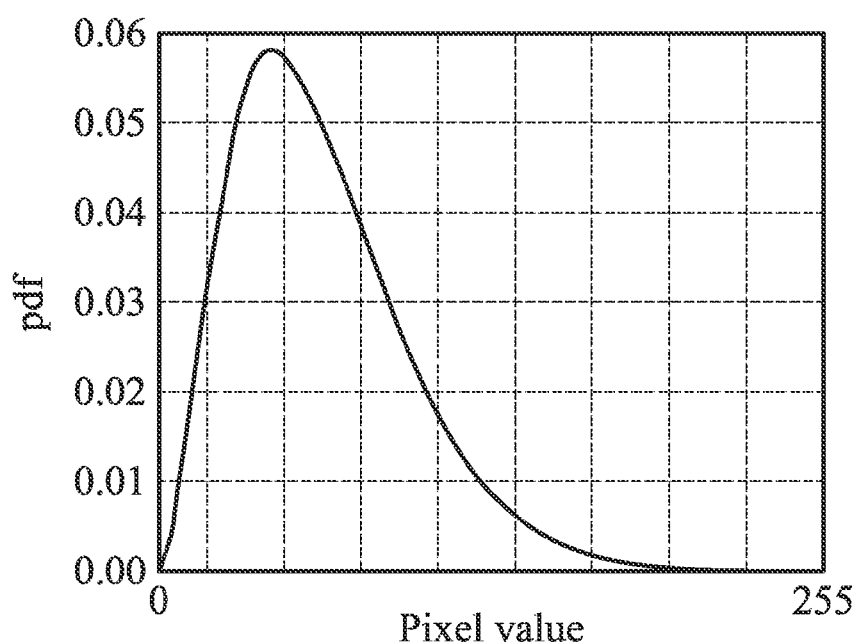

When mapping the input image signal to the output image signal according to the mapping function by the mapper 110, if there is an empty pixel value region 401 (i.e., pixel values with nearly zero probability except for noise; see FIG. 4A) at the beginning of the PDF curve, directly applying the mapping function may cause the size of the empty pixel value region to be improperly increased and thus reducing the contrast, resulting in a washed-out effect. The offset calculator 108 (along with the mapper 110) may be used to facilitate the removal of the empty pixel value region before applying the mapping function to the input image signal. The mapper 110 may shift the pixel values of the plurality of pixels by an offset pixel value before mapping, wherein the offset pixel value is calculated by the offset calculator 108 and is the size of the empty pixel value region which corresponds to a cumulative distribution function of a threshold value that may be designed according to different requirements, such as a cumulative distribution function of 0.005. Therefore, pixel values with probabilities corresponding to below a cumulative distribution function of 0.005 are considered empty and are removed (i.e., shifted), and the possible washed-out effect may be avoided. FIG. 4A and FIG. 4B show a PDF before and after the shifting, respectively. In another embodiment, the offset calculator 108 may be omitted and the input image signal may be directly mapped to the output image signal by the mapper 110 according to the mapping function without being shifted.

The mapper 110 receives the mapping function determined by the mapping function calculator 106 and the offset pixel value (if any) calculated by the offset calculator 108 to map the input image signal to the output image signal according to the mapping function and the offset pixel value (if any), and the output image signal is then outputted to a display or a memory device.

In another embodiment of the invention, if the input image signal is a frame of a video, since changing mapping functions frequently in a video may result in flicker, the adaptive contrast enhancement apparatus 100 may further comprise a scene-change detector 112 coupled to the PDF and CDF calculator 104 to detect a change of scene of the video, and the mapping function may be changed only when there is a change of scene to reduce flicker. The change of scene of the video is detected by calculating a difference between the probability density function of the input image signal and the probability density function of a previous input image signal (i.e., a previous frame of the video, which may be saved in a memory device (not shown)), and when the difference is below a scene-change threshold (e.g., a difference of 0.05%), it is determined that there is no scene change and the mapping function of the previous input image signal may be used as the mapping function of the input image signal; when the difference is above the scene-change threshold, it is determined that there is a scene change and the mapping function of the input image signal may be determined by the mapping function calculator 106 and the offset calculator 108 as described in above.

Figure 5:
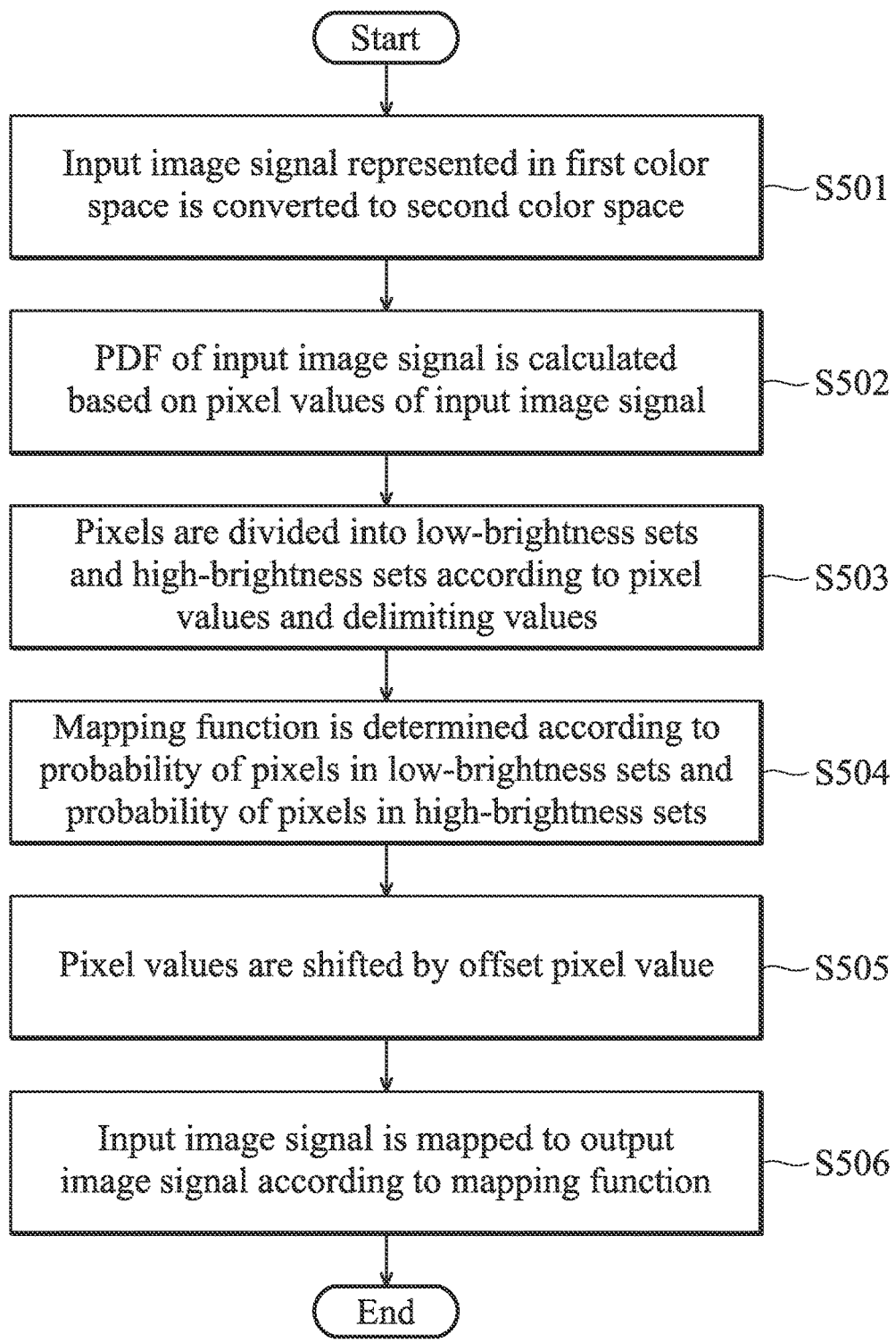
FIG. 5 is a flow chart of an adaptive contrast enhancement method of an embodiment of the invention.

FIG. 5 is a flow chart of an adaptive contrast enhancement method of an embodiment of the invention. In Step S501, an input image signal represented in a first color space is converted to a second color space; in other embodiments, this step may be omitted. In Step S502, a PDF of the input image signal is calculated based on pixel values of a plurality of pixels of the input image signal. In Step S503, the plurality of pixels are divided into a plurality of low-brightness sets and a plurality of high-brightness sets each corresponding to one of the plurality of low-brightness sets according to the pixel values and a plurality of delimiting values. In Step S504, a mapping function is determined according to the probability of the plurality of pixels in the low-brightness sets and the probability of the plurality of pixels in the high-brightness sets, wherein the mapping function is determined according to the smallest delimiting value that corresponds to the low-brightness set having a probability higher than the probability of the corresponding high-brightness set by a contrast factor. In Step S505, the pixel values of the plurality of pixels are shifted by an offset pixel value, wherein the offset pixel value is the pixel value corresponding to a cumulative distribution function of a threshold value; in other embodiments, this step may be omitted. In Step S506, the input image signal (after being shifted by the offset pixel value, if any) is mapped to an output image signal according to the mapping function. In other embodiments, if the input image signal is a frame of a video, the adaptive contrast enhancement method may further comprise a Step S507 (not shown) that uses the mapping function of a previous input image signal as the mapping function of the input image signal when a difference between the probability density function of the input image signal and the probability density function of the previous input image signal is below a scene-change threshold.

In summary, the adaptive contrast enhancement apparatus and method of the present invention may adaptively enhance the contrast of the input image signal so that the contrast in the darker part of the input image signal is enhanced without causing overexposure in the brighter part; steep mapping functions may be assigned to darker images and moderate mapping functions may be assigned to brighter images so that all kinds of images with different brightness distributions may all be properly adjusted to yield satisfying contrasts. In addition, the pixel values of the plurality of pixels may be shifted to remove the empty pixel value region, and the possible washed-out effect may be avoided. Furthermore, if the input image signal is a frame of a video, the invention may change the mapping function only when there is a change of scene of the video so as to reduce flicker. The adaptive contrast enhancement apparatus and method of the present invention may be applied in any application field concerning the processing of images or video frames, such as images or video frames to be displayed on various displays or projectors, images or video frames captured from cameras, etc.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An adaptive contrast enhancement method to adjust contrast of an image of an input image signal, comprising:
    calculating a probability density function based on pixel values of a plurality of pixels of the input image signal;
    dividing the plurality of pixels into one of a plurality of low-brightness sets and high-brightness sets according to the pixel values of the plurality of pixels, wherein a part of the plurality of pixels with pixel values below one of a plurality of delimiting values are allocated to the low-brightness set and a part of the plurality of pixels with pixel values above the delimiting value are allocated to the high-brightness set;
    determining a mapping function according to the probability of the plurality of pixels in the low-brightness set and the probability of the plurality of pixels in the high-brightness set; and
    mapping the input image signal to an output image signal according to the mapping function,
    wherein the method is performed by an adaptive contrast enhancement apparatus; and
    wherein the image with adjusted contrast is displayed according to the output image signal.

2. The adaptive contrast enhancement method as claimed in claim 1, wherein the plurality of pixels are further divided into others of the low-brightness sets and the high-brightness sets each corresponding to one of the plurality of low-brightness sets according to each of the plurality of delimiting values.

3. The adaptive contrast enhancement method as claimed in claim 2, wherein the mapping function is determined according to a smallest delimiting value that corresponds to the low-brightness set having a probability higher than the probability of the corresponding high-brightness set by a contrast factor.

4. The adaptive contrast enhancement method as claimed in claim 3, wherein an exponent of the mapping function corresponding to a smaller smallest delimiting value is smaller than the exponent of the mapping function corresponding to a larger smallest delimiting value.

5. The adaptive contrast enhancement method as claimed in claim 1, wherein the mapping function is linear with a slope of 1 when above a linear pixel value.

6. The adaptive contrast enhancement method as claimed in claim 1, further comprising:
shifting the pixel values of the plurality of pixels by an offset pixel value, wherein the offset pixel value is the pixel value corresponding to a cumulative distribution function of a threshold value.

7. The adaptive contrast enhancement method as claimed in claim 1, further comprising:
using the mapping function of a previous input image signal as the mapping function of the input image signal when a difference between the probability density function of the input image signal and the probability density function of the previous input image signal is below a scene-change threshold.

8. The adaptive contrast enhancement method as claimed in claim 1, further comprising:
converting the input image signal represented in a first color space to a second color space.

9. An adaptive contrast enhancement apparatus to adjust a contrast of an input image signal, comprising:
a probability density function and cumulative distribution function calculator, calculating a probability density function based on pixel values of a plurality of pixels of an input image signal;
a mapping function calculator, dividing the plurality of pixels into one of a plurality of low-brightness sets and high-brightness sets according to the pixel values of the plurality of pixels and determining a mapping function according to the probability of the plurality of pixels in the low-brightness set and the probability of the plurality of pixels in the high-brightness set, wherein a part of the plurality of pixels with pixel values below one of a plurality of delimiting values are allocated to the low-brightness set and a part of the plurality of pixels with pixel values above the delimiting value are allocated to the high-brightness set; and
a mapper, mapping the input image signal to an output image signal according to the mapping function;
wherein the image with adjusted contrast is displayed according to the output image signal.

10. The adaptive contrast enhancement apparatus as claimed in claim 9, wherein the plurality of pixels are further divided into others of the low-brightness sets and the high-brightness sets each corresponding to one of the plurality of low-brightness sets according to each of the plurality of delimiting values.

11. The adaptive contrast enhancement apparatus as claimed in claim 10, wherein the mapping function is determined according to a smallest delimiting value that corresponds to the low-brightness set having a probability higher than the probability of the corresponding high-brightness set by a contrast factor.

12. The adaptive contrast enhancement apparatus as claimed in claim 11, wherein an exponent of the mapping function corresponding to a smaller smallest delimiting value is smaller than the exponent of the mapping function corresponding to a larger smallest delimiting value.

13. The adaptive contrast enhancement apparatus as claimed in claim 9, wherein the mapping function is linear with a slope of 1 when above a linear pixel value.

14. The adaptive contrast enhancement apparatus as claimed in claim 9, further comprising:
an offset calculator, calculating an offset pixel value as the pixel value corresponding to a cumulative distribution function of a threshold value, wherein the mapper shifts the pixel values of the plurality of pixels by the offset pixel value before mapping the input image signal to the output image signal according to the mapping function.

15. The adaptive contrast enhancement apparatus as claimed in claim 9, further comprising:
a scene-change detector, calculating a difference between the probability density function of the input image signal and the probability density function of a previous input image signal, wherein the mapping function of the previous input image signal is used as the mapping function of the input image signal by the mapper when the difference between the probability density function of the input image signal and the probability density function of the previous input image signal is below a scene-change threshold.

16. The adaptive contrast enhancement apparatus as claimed in claim 9, further comprising:
a color space converter, converting the input image signal represented in a first color space to a second color space.

* * * * *